US008312948B1

(12) United States Patent
Carrington et al.

(10) Patent No.: US 8,312,948 B1
(45) Date of Patent: Nov. 20, 2012

(54) DUAL MECHANICAL BRAKE RELEASE FOR ELECTRIC DRIVE SYSTEM

(75) Inventors: Ryan Allen Carrington, Sullivan, IL (US); William Howard Baker, Dalton City, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 13/166,278

(22) Filed: Jun. 22, 2011

Related U.S. Application Data

(60) Provisional application No. 61/357,407, filed on Jun. 22, 2010.

(51) Int. Cl.
*B60K 1/00* (2006.01)
(52) U.S. Cl. ....... 180/65.1; 188/216; 188/161; 180/6.48
(58) Field of Classification Search ................. 180/65.6, 180/370, 206, 207, 6.48, 65.1; 188/3, 5, 188/69, 299.1, 216, 231, DIG. 3; 192/3.62, 192/219.4, 220.2, 220.6, 220.7
See application file for complete search history.

(56) References Cited

U.S. PATENT DOCUMENTS

| | | | | |
|---|---|---|---|---|
| 2,868,030 A * | 1/1959 | Forwald | ........................ | 74/89.38 |
| 2,974,756 A * | 3/1961 | Roehm | ........................ | 188/171 |
| 3,892,296 A | 7/1975 | DePuydt et al. | | |
| 4,416,107 A * | 11/1983 | Hoff | ................................ | 56/11.3 |
| 4,696,153 A * | 9/1987 | Boains, Jr. | ........................ | 56/295 |
| 5,042,238 A * | 8/1991 | White et al. | .................... | 56/11.8 |
| 5,186,288 A * | 2/1993 | Sommer | ........................ | 188/171 |
| 5,984,425 A * | 11/1999 | Orzal | ................................ | 303/3 |
| 6,170,922 B1 * | 1/2001 | Vannorsdel et al. | ............. | 303/71 |
| 6,264,228 B1 | 7/2001 | Westervelt | | |
| 6,280,004 B1 | 8/2001 | Greaves, Jr. | | |
| 6,672,411 B1 * | 1/2004 | Mouser | ........................ | 180/6.32 |
| 7,469,717 B2 * | 12/2008 | Leadley | ........................ | 137/559 |
| 2006/0170184 A1 * | 8/2006 | Lan et al. | ........................ | 280/264 |
| 2007/0216217 A1 | 9/2007 | Clark et al. | | |
| 2008/0156568 A1 * | 7/2008 | Raz | ................................ | 180/275 |
| 2008/0179860 A1 | 7/2008 | Bell | | |
| 2009/0114461 A1 * | 5/2009 | Clark et al. | ................. | 180/65.1 |

* cited by examiner

*Primary Examiner* — John Walters
*Assistant Examiner* — James Triggs
(74) *Attorney, Agent, or Firm* — Neal, Gerber & Eisenberg LLP

(57) ABSTRACT

An actuator assembly for use with a transmission drive system having a pair of transaxles where each transaxle includes an electric motor and a brake release pin extending from a brake housing, where the release pins are both moveable from a first, engaged position to a second, released position. The actuator assembly includes a support bracket fastened to each transaxle, a sleeve attached to the support bracket and arranged generally parallel to the axes of the first and second release pins, a rod moveably disposed within the sleeve and extending from each end thereof, a pair of levers engaged to the two release pins and to the rod, a fulcrum attached to the support bracket, and an actuator arm engaged to the rod and pivotable about the fulcrum to longitudinally move the rod within the sleeve, wherein the actuator arm is moveable.

13 Claims, 3 Drawing Sheets

DUAL MECHANICAL BRAKE RELEASE FOR ELECTRIC DRIVE SYSTEM

CROSS REFERENCE

This application claims the benefit of U.S. Provisional Patent Application No. 61/357,407 filed on Jun. 22, 2010, which is incorporated herein in its entirety.

FIELD OF THE INVENTION

This invention relates to component assemblies for electric drive systems for self-propelled vehicles or machines, and is particularly useful for brake release mechanisms for electric drives used in self-propelled vehicles or machines such as lawn mowers, snow-throwers, and lawn or garden tractors.

BACKGROUND OF THE INVENTION

Self-propelled vehicles or other machines such as self-propelled or riding lawn mowers, snow-throwers, and lawn or garden tractors are known. Electric drive systems for such vehicles or machines typically employ an automatic fail-safe or parking brake in association with each electric drive motor which drives one or more axles.

It would be advantageous to be able to release the fail-safe brake(s) to allow the vehicle to be towed or otherwise moved, e.g. for servicing the vehicle, when it is not in operation or the batteries are discharged. In particular, it would be advantageous to be able to simultaneously release both brakes in a dual transaxle application such as a zero-turn lawn mower.

SUMMARY OF THE INVENTION

This invention relates to an assembly useful in association with electric drive systems for self-propelled vehicles or machines having dual fail-safe or parking brake mechanisms comprising a dual brake release assembly.

This invention also relates to a self-propelled vehicle or machine having an electric drive system comprising dual fail-safe brakes in association with a dual brake release assembly.

DETAILED DESCRIPTION OF THE INVENTION

An example of a self-propelled vehicle that can be modified in accordance with this invention is described in U.S. Patent Application Publication No. 2009/0065273, filed as Ser. No. 12/209,120 on Sep. 11, 2008, the entire disclosure of which is incorporated herein by reference.

Figure 1:
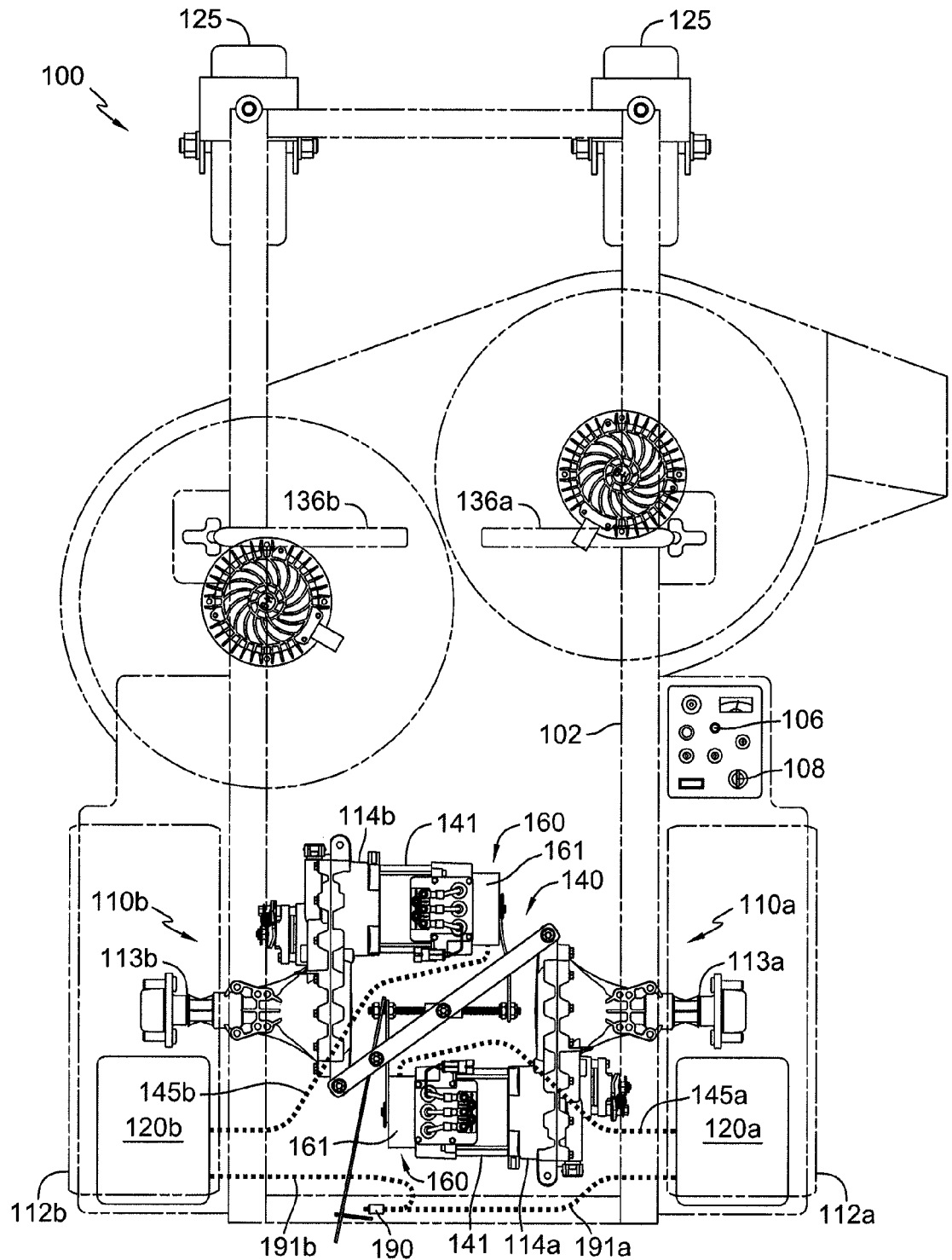
FIG. 1 is a top plan view of a vehicle in the form of a riding lawn mower to which one or more principles or aspects of the present invention has been be applied, including an embodiment of a dual brake release assembly.

Turning now to the figures, wherein like reference numerals refer to like elements, FIG. 1 illustrates an embodiment of a utility vehicle in the form of mowing vehicle 100, which incorporates one or more principles of the present invention. Power supply (not shown) of vehicle 100 drives an electric motor 141 on each of two electric transaxles, 110a and 110b, each separately driving one of two rear wheels 112a and 112b, to implement zero turn vehicle functionality. A pair of pivoting front casters 125 is also provided to facilitate zero turn vehicle functionality. The transaxles drive the wheels 112a and 112b via axle shafts 113a and 113b, which are coupled to transmissions 114a and 114b, which are driven by electric motors 141. In this embodiment, the electric transaxles 110a and 110b are nested in a side-by-side, parallel arrangement as shown in FIG. 1.

Referring to FIG. 1, mowing vehicle 100 may include one or more brake systems. In the embodiment shown, switches (not shown), are opened when steering/drive levers 136a and 136b are both positioned in a neutral, drive-disengaged position, allowing engagement of fail-safe brakes 160, each brake 160 having an external brake housing 161 from which a release pin 162a, 162b extends. Similarly, when drive levers 136a and 136b are both positioned in the neutral, drive-disengaged position, those same switches (or a separate set of switches) may also signal or initiate a blade stop function as a safety and power management feature. Dual brake release assembly 140 is shown positioned between transmissions 114a and 114b and will be described in detail below in relation to FIGS. 2 and 3.

Each brake 160 is operatively joined to its respective electric motor 141 to form a portion of one of a pair of nested transaxles having their housings aligned such that their respective release pins 162a, 162b extend in opposite directions along generally parallel axes. In general, the fail-safe brakes 160 illustrated in FIGS. 1-3 may be of an electromechanical design well known to one of skill in the art. For example, each brake 160 may comprise a friction disk or the like (not shown) engaged to the motor shaft (not shown) of electric motor 141, the friction disk coming into frictional engagement with an inner surface of brake housing 161 under the influence of a bias spring (not shown) to arrest rotation of the motor shaft. Brakes 160 have a coil (not shown) that, when energized by power supplied via a drive controller 120a, 120b through brake leads 145a, 145b, respectively, releases the friction disk from engagement with brake housing 161, permitting free rotation of the motor shaft when electric motor 141 is being driven. Brakes 160 may also have a manual brake release mechanism (not shown) engaged to the respective release pins 162a, 162b, which may be levered a greater distance outside of brake housing 161 against the force of the bias spring to release the brake, permitting free rotation of the motor shaft when the vehicle is disabled and being pushed or towed. Dual brake release assembly 140 is configured to act on both release pins 162a, 162b simultaneously.

Figure 2:
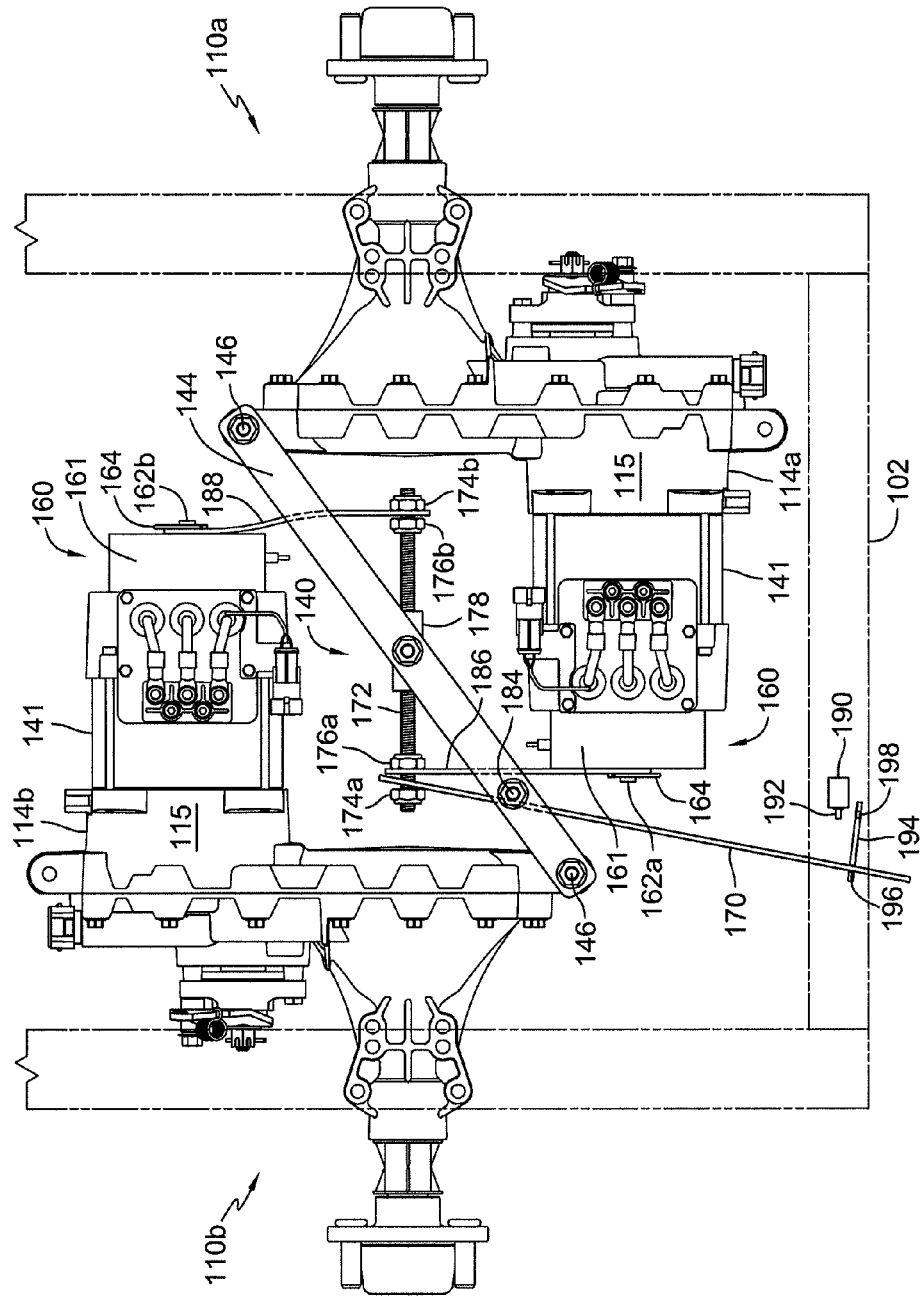
FIG. 2 is a top plan view of a portion of the vehicle depicted in FIG. 1 showing the dual brake release assembly of FIG. 1 in greater detail, and wherein the fail-safe brakes are engaged.

FIG. 2 shows dual brake release assembly 140 in non-released mode. Threaded release rod 172 passes through manual release lever 170 and manual release lever 170 is retained in relation to one end of threaded release rod 172 by end hex nut 174a and inner hex nut 176a. Also retained in relation to threaded release rod 172 by end hex nut 174a and inner hex nut 176a is one end of first release bar 186 which has an opening (not shown) therethrough. The other end of first release bar 186 extends for some distance beyond the opening and is retained on brake release pin 162a by cotter pin 164 extended through an opening in the exposed end of brake release pin 162a. Second release bar 188 has an opening (not shown) therethrough in an end thereof which is retained in relation to the other end of threaded release rod 172 by end hex nut 174b and inner hex nut 176b. The other end of second release bar 188 has an opening (not shown) therethrough by means of which it is retained on brake release pin 162b by cotter pin 164. A medial portion of threaded release rod 172 passes through guide sleeve 178 which is fastened to diagonal stabilizer bar 144. Diagonal stabilizer bar 144 is secured in relation to transmissions 114a and 114b to support other components of dual brake release assembly 140 by securing bolts 146 bolted on each gear case 115. Diagonal stabilizer bar 144 also has an opening therethrough in proximity to manual release lever 170 through which distal bolt 184 passes. Distal bolt 184 extends through stabilizer bar 144 so that a portion of distal bolt 184 along its long axis is positioned in close proximity to manual release lever 170. Receiving bracket 194 has a first slot 196 in which the free end of manual release lever 170 rests. A lock-out switch 190 is mounted on vehicle frame 102 in proximity to manual release lever 170 with switch plunger 192 exposed. Alternatively, lock-out switch 190 may be mounted on a flange (not shown) of bracket 194 to ensure proper location of switch 190 in relation to slot 198 of bracket 194.

Figure 3:
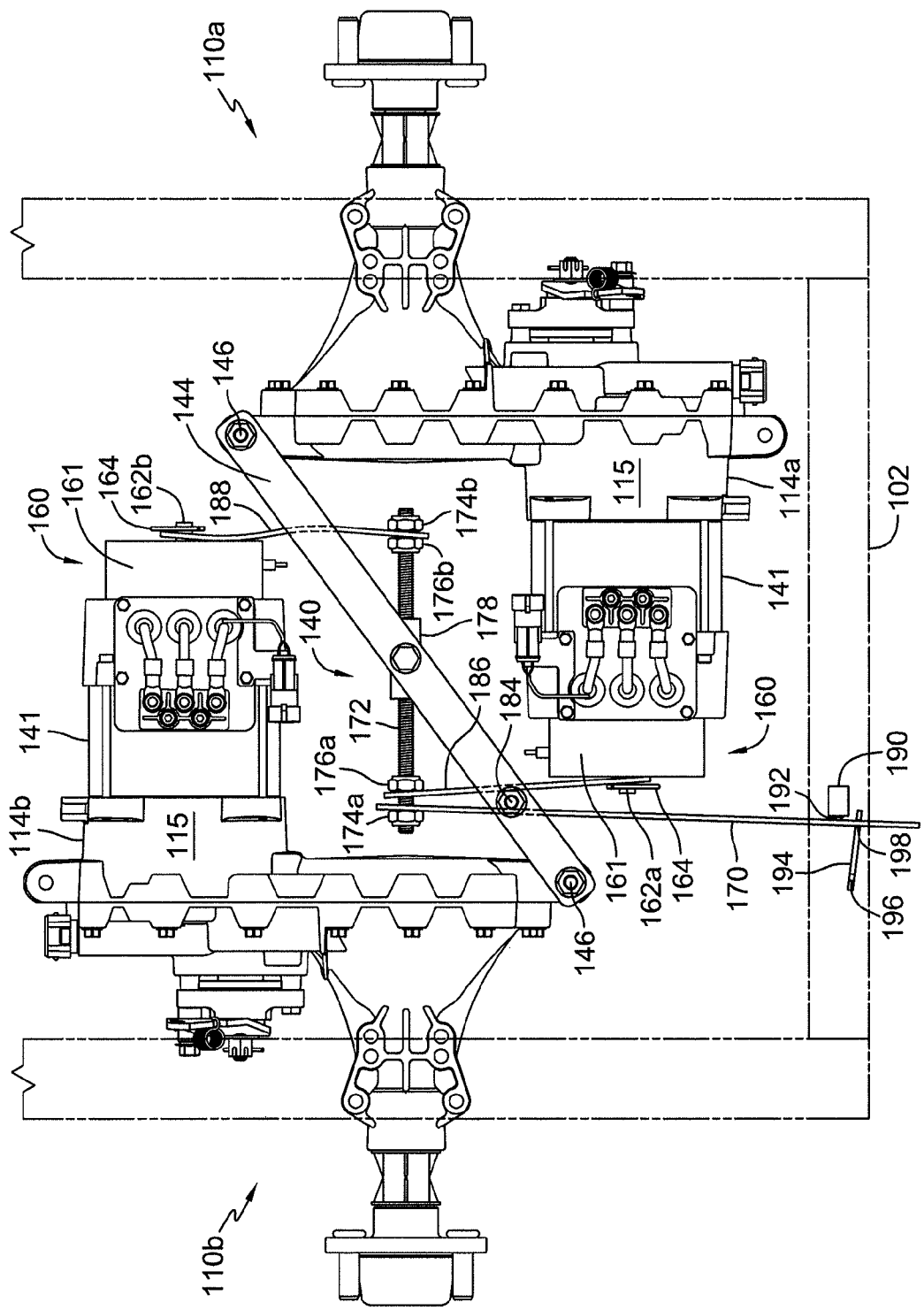
FIG. 3 is a top plan view of the same portion of the vehicle shown in FIG. 2, wherein the fail-safe brakes are released.

FIG. 3 shows dual brake release 140 in released mode in which manual release lever 170 has been manipulated to the right to fit in second slot 198. That rightward movement of manual release lever 170 causes a medial portion of lever 170 to bear against distal bolt 184 and causes the end of lever 170 retained on threaded release rod 172 to bear upon end hex nut 174a and thereby move threaded rod 172 along its axis to the left. This movement causes inner hex nut 176a to bear upon the end of first release bar 186 retained on rod 172. The other end of first release bar 186 acts as a fulcrum against an outer surface of brake housing 161 and partially extracts brake release pin 162a, thereby releasing the fail-safe brake mechanism associated therewith. The leftward movement of rod 176 further causes end hex nut 174b to bear against the end of second release bar 188 retained on rod 172. Second release bar 188 has a curved portion to translate the leftward movement of rod 172 into rightward movement of brake release pin 162b, the curved portion acting as a fulcrum against brake housing 161 to partially extract brake release pin 162b thereby releasing the fail-safe brake mechanism associated therewith. Thus, both fail-safe brakes 160 are released through a single operation and vehicle 100 can be towed or otherwise moved other than under its own power.

Lever 170 rests in second slot 198 in bracket 194 when the dual brake release assembly 140 has released the fail-safe brakes 160. Movement of lever 170 to the release position depresses switch plunger 192 such that lock-out switch 190 sends a signal to the drive controllers 120a, 120b through switch leads 191a, 191b, respectively, which prevents operation of the vehicle. Drive controllers 120a, 120b and switch leads 191a, 191b are depicted in FIG. 1. An indicator lamp 106 can be included and wired so that when a key (not shown) is inserted into the vehicle key switch 108 of vehicle 100 with the fail-safe brake 160 released, the lamp will light to indicate to the operator that the drive system is locked out due to actuation of dual brake release assembly 140.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. An actuator assembly for use with a transmission drive system having a first transaxle and a second transaxle, the first transaxle having a first electric motor, a first brake mechanism disposed in a first brake housing, and a first release pin extending from the first brake housing, and the second transaxle having a second electric motor, a second brake mechanism disposed in a second brake housing, and a second release pin extending from the first brake housing, wherein the first release pin and the second release pin are both moveable from a first, engaged position to a second, released position in which each of the first and second release pins extends farther out from its respective brake housing, and wherein the first release pin and the second release pin extend in opposite directions along generally parallel axes, the actuator assembly comprising:

a support bracket having a first end fastened to the first transaxle and a second end fastened to the second transaxle;

a sleeve attached to the support bracket between the first end and the second end thereof, wherein the sleeve is disposed generally parallel to the axes of the first and second release pins;

a rod moveably disposed within the sleeve and extending from each end thereof;

a first lever engaged to the first release pin and further engaged to the rod adjacent a first terminus thereof;

a second lever engaged to the second release pin and further engaged to the rod adjacent a second terminus thereof, opposite the first terminus;

a fulcrum attached to the support bracket;

an actuator arm engaged to the rod adjacent the first terminus thereof and pivotable about the fulcrum to longitudinally move the rod within the sleeve, wherein the actuator arm is moveable between a first position in which each of the first and second release pins is in the first, engaged position and a second position in which each of the first and second release pins is in the second, released position.

2. The actuator assembly of claim 1, further comprising a receiving bracket for the actuator arm having a first slot corresponding to the first position of the actuator arm and a second slot corresponding to the second position of the actuator arm.

3. The actuator assembly of claim 2, further comprising a switch mounted proximate to the receiving bracket, wherein the switch is closed by contact with the actuator arm in the second position.

4. The actuator assembly of claim 3, wherein the switch communicates with at least one drive controller for the first and second electric motors to prevent power from being supplied to the first and second electric motors when the actuator arm is in the second position.

5. The actuator assembly of claim 1, wherein the first lever is straight and a first end of the first lever adjacent the first release pin acts as a fulcrum against the first brake housing when the actuator arm is moved to the second position.

6. The actuator assembly of claim 1, wherein the second lever is curved and a medial portion of the second lever adjacent the second release pin acts as a fulcrum against the second brake housing when the actuator arm is moved to the second position.

7. An electric drive assembly having a fail-safe brake mechanism, the electric drive assembly comprising:

first and second electric drive mechanisms, each electric drive mechanism comprising an electric motor having a motor housing and driving an output axle;

first and second fail-safe brake systems, each fail-safe brake system comprising an electro-mechanical brake engaged to one of the electric motors to provide a braking force to the electric motor when power is removed from the electro-mechanical brake, a brake housing joined to the motor housing, and a manual brake release mechanism having a release pin extending from the brake housing;

an actuator assembly engaged to the respective release pins of the first and second fail-safe brake systems, the actuator assembly comprising:
   a support bracket fixedly disposed between the first electric drive mechanism and the second electric drive mechanism;
   a sleeve joined to the support bracket;
   a rod moveably disposed within the sleeve and extending from each end thereof;
   a first lever engaged to the release pin of the first fail-safe brake system and further engaged to the rod adjacent a first terminus thereof;
   a second lever engaged to the release pin of the second fail-safe brake system and further engaged to the rod adjacent a second terminus thereof, opposite the first terminus;
   a fulcrum attached to the support bracket;
   an actuator arm engaged to the rod adjacent the first terminus thereof and pivotable about the fulcrum to longitudinally move the rod within the sleeve, wherein the actuator arm is moveable between a first position in which each release pin is in a first, engaged position and a second position in which each release pin is in a second, released position.

8. The electric drive assembly of claim 7, further comprising a positioning member for the actuator arm having a first slot corresponding to the first position and a second slot corresponding to the second position.

9. The electric drive assembly of claim 8, further comprising a switch mounted proximate to the positioning member, wherein the switch is closed by contact with the actuator arm in the second position.

10. The electric drive assembly of claim 9, wherein the switch communicates with at least one drive controller for the electric motors to prevent power from being supplied to the electric motors when the actuator arm is in the second position.

11. The electric drive assembly of claim 7, wherein the first lever is straight and a first end of the first lever adjacent the corresponding release pin acts as a fulcrum against the brake housing when the actuator arm is moved to the second position.

12. The electric drive assembly of claim 7, wherein the second lever is curved and a medial portion of the second lever adjacent the corresponding release pin acts as a fulcrum against the brake housing when the actuator arm is moved to the second position.

13. The electric drive assembly of claim 7, wherein the first electric drive mechanism comprises a first gear housing and the second electric drive mechanism comprises a second gear housing, and the support bracket is joined to the first gear housing and the second gear housing.

* * * * *